Figure 1:
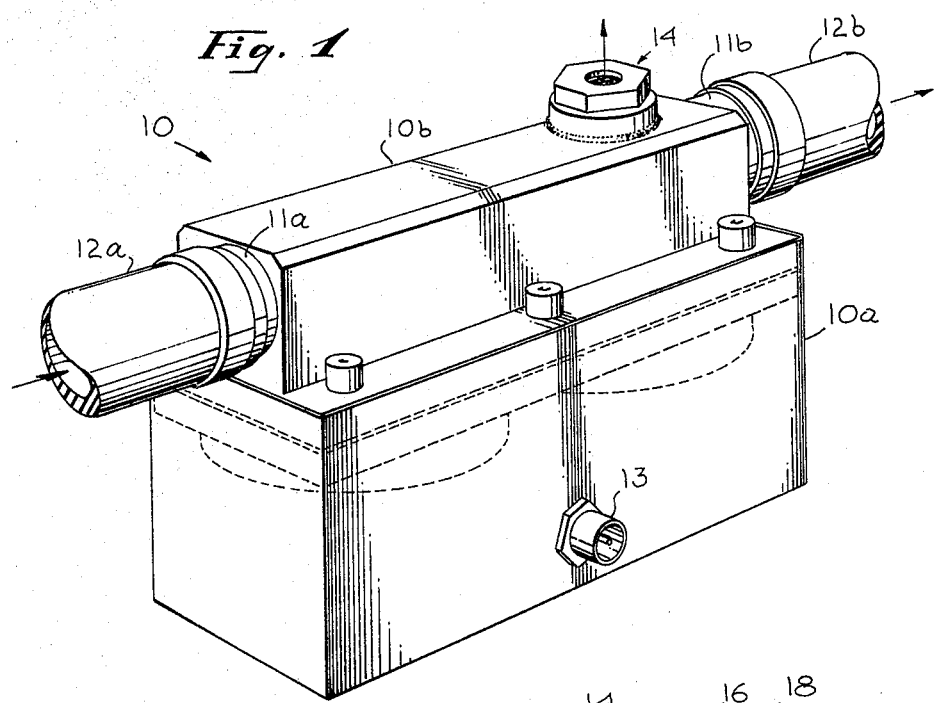

Aug. 16, 1966        A. A. SNAPER        3,266,631

APPARATUS FOR SEPARATING A FLUID MIXTURE BY ACOUSTIC ENERGY

Filed March 16, 1964

INVENTOR
ALVIN A. SNAPER
BY Allen E. Botney
ATTORNEY

United States Patent Office 3,266,631
Patented August 16, 1966

3,266,631
APPARATUS FOR SEPARATING A FLUID MIXTURE BY ACOUSTIC ENERGY
Alvin A. Snaper, P.O. Box 83, Burbank, Calif.
Filed Mar. 16, 1964, Ser. No. 352,237
1 Claim. (Cl. 210—542)

The present invention relates in general to apparatus by means of which one fluid can be separated from another and more particularly relates to apparatus of this kind based on ultra-sonic principles.

As is well known, it is oftentimes necessary to separate a gas from the liquid in which it may be dissolved or to separate one liquid from a mixture of two or more liquids. This has been a relatively difficult problem to solve in the past and various chemical, mechanical and electrical arrangements have been devised to cope with this problem. However, for a variety of reasons, none of these earlier techniques have proved to be entirely satisfactory, either because the equipment was expensive, or the process time-consuming, or because it was not effective to the degree desired, or the like. For example, in attempting to remove air or other gas bubbles from a liquid-type medium, it is the common practice today to place the abovesaid medium in a vacuum chamber which has been raised to a higher than ambient temperature. By so doing, a substantial amount of the gas involved is removed after a relatively extended period of time, as will be recognized by those skilled in the art. However, with this method and as was previously mentioned, a considerable amount of time is needed, relatively speaking, in pursuing the desired separation and, even then, a portion of the gas may still remain entrapped in the fluid. Furthermore, the vacuum chamber equipment mentioned is relatively bulky, expensive and also takes an undue amount of time to operate. Accordingly, there has been a long-felt need for an apparatus that would separate a gas from a liquid or one liquid from another without the many disadvantages encountered among these prior-art devices.

The present invention facilitates and expedites the separation of these media, thereby overcoming and avoiding these disadvantages, by providing a separator based on ultra-sonic principles. More particularly, in accordance with the basic concept of the invention, an apparatus is provided through which the fluid "mixture" continuously flows and, while it is passing through the apparatus, the fluid is subjected to ultra-sonic vibrations which has the effect of separating one fluid constituent from another. More specifically, in the case of a gas dissolved in a liquid, it has been found that the ultra-sonic energy fed to the fluid causes the release of gas in the form of gas bubbles. This gas is then permitted to escape through a valve to the surrounding atmosphere. In the case of two or more miscible liquids, the ultra-sonic power fed to the fluid medium is controlled so that it is above the cavitation level of one of the liquids but not of the others. As a result, the cavitated liquid is released as a vapor from the others and thereafter, as before, escapes through the valve. It is preferable for the purpose of obtaining optimum operation that the separator apparatus be internally arranged to form a cavity through which the fluid passes and which is acoustically matched to the transducer unit that supplies the power to the cavity and fluid therein.

An obvious advantage of the present invention is the fact that separation can be initiated while the fluid is flowing, thereby making it possible to treat or process large fluid volumes in a relatively short period of time. A further obvious advantage provided by the present invention is the fact that the same apparatus can be used to separate out a gas from a fluid or one fluid from another, something that cannot readily be done with the prior-art equipment. Furthermore, as compared to the earlier devices, the present invention is less bulky, less expensive, more versatile and equally as effective if not more so.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

Figure 2:
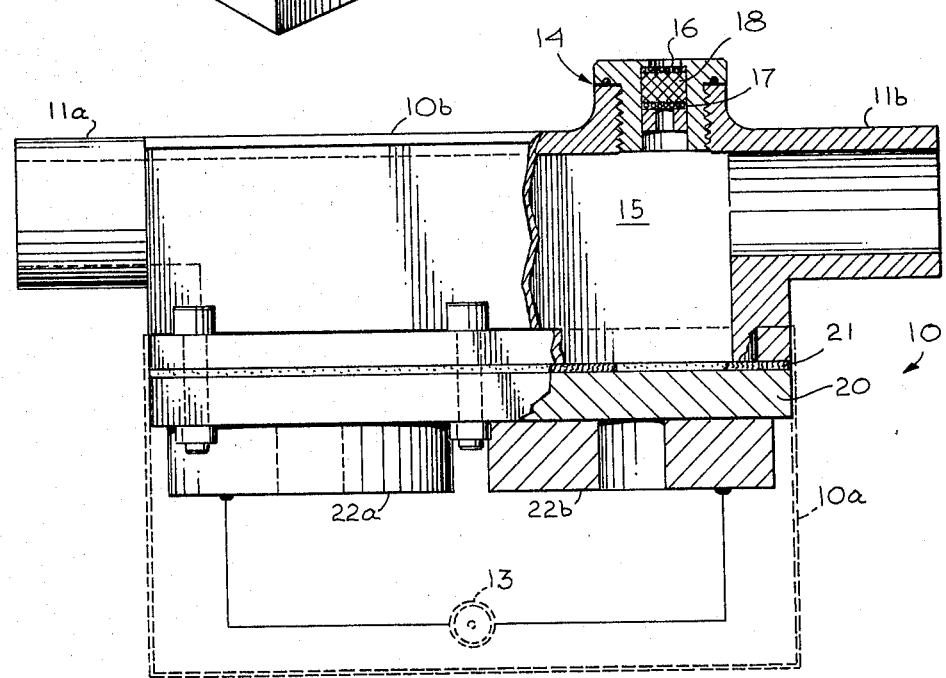

FIGURE 1 is an isometric view of a preferred embodiment of the present invention; and FIGURE 2 is a front view, partly in cross-section, of the embodiment shown in FIG. 1.

Referring now to the figures in the drawing, the external appearance and structure of apparatus according to the present invention is shown in FIG. 1. As shown therein, the apparatus comprises a housing structure 10 that is preferably divided into two units respectively designated 10a and 10b, unit 10a housing or enclosing the power supply elements for the apparatus and unit 10b containing the chamber through which the fluid flows for separation purposes. In this regard, integral with and respectively extending from the opposite ends of unit 10b are pipes or hoses 11a and 11b which connect to the aforesaid chamber. Piping 11a may be considered an entrance port while piping 11b may be considered an exit port, the fluid entering the chamber through piping 11a and later leaving the chamber via piping 11b, as is indicated by the arrows. In order to provide a continuity of fluid flow, pipe elements 11a and 11b are each linked to a length of hose designated 12a and 12b in the figure. However, since hoses 12a and 12b are not a part of the present invention, they are illustrated in broken-line form.

Also shown in FIG. 1 as a part of the overall structure is a jack-type of coupler 13 by means of which electrical power is fed to the apparatus and a valve 14 by means of which a gas or vapor separated from the fluid medium passing through the apparatus may escape into the surrounding atmosphere. Returning to electrical element 13, a variable oscillator is connected to the apparatus at this point, the oscillator being variable over a frequency range that preferably extends from at least one megacycle down to at least 15 kilocycles.

A more detailed understanding of the subject apparatus may be obtained from the cross-sectional view presented in FIG. 2 to which reference is now made. As previously mentioned, housing unit 10b encloses a resonant cavity 15 between its walls, the cavity connecting to piping 11a and 11b as well as to valve 14. Valve 14 may be any kind of valve that will permit a gas or vapor to escape through it in one direction but not in the reverse direction. Thus, in the figure, the valve will allow the gas or vapor that is under pressure in cavity 15 to escape from the cavity into the atmosphere but will prevent air (or any other gas) from passing through it to the cavity. Accordingly, valve 14 may be constructed in any one of a number of different ways, the valve shown in FIG. 2 merely being representative. As such, it includes a first very fine screen or wire mesh 16, a second very fine screen or wire mesh 17, and a disk of very fine porous material 18 mounted between them in a sandwich-type arrangement.

In housing unit 10a, a plate 20, preferably a metal plate, is rigidly fixed or fastened to the bottom side of housing unit 10b, a layer of insulation 21 preferably being interposed between them. Finally, a pair of transducers 22a and 22b are rigidly mounted on plate 20, the transducers being electrically connected to element 13 so that electrical power from the oscillator may be applied to them. Transducers 22a and 22b may be of the magnetostrictive, piezoelectric or ferroelectric kind, all of which are well known. Accordingly, no detailed description of them is deemed necessary here.

In considering the operation, it will be initially assumed that a fluid is passed through the apparatus in which a gas, such as air, is dissolved and which it is desired to release or separate out from the fluid itself. More specifically, the fluid enters cavity 15 via hose 12a and piping 11a and it leaves or exists from the cavity via piping 11b and hose 12b. At the same time that fluid flows through cavity 15, electrical power at an ultrasonic frequency is fed through element 13 to transducers 22a and 22b. As a result and in accordance with well-known principles, transducers 22a and 22b are caused to vibrate at the same ultra-sonic frequency and these vibrations are transferred through plate 20 and insulation 21 to the walls of cavity 15. Since the fluid is flowing through the cavity, this acoustical or ultra-sonic power is ultimately transferred to the fluid. In consequence thereof, the dissolved gas is caused to be released from the fluid and, when this happens, the bubbles of gas rise and thereafter collect in the proximity of valve 14 which opens to permit the gas to escape into the atmosphere when the gas pressure in the cavity has sufficiently built up. As previously stated, knowing the characteristics of the fluid, the operating frequency is selected so as to acoustically match the cavity and fluid combination to the transducer power output unit in order to provide for optimum efficiency.

In the event miscible liquids are passed through the apparatus and it is desired to separate one liquid from another, the operation is substantially the same with the exception that the magnitude of the power fed to the system is more accurately controlled. The reason for this is that different liquids cavitate at different power levels as is well known by those skilled in the acoustical arts. Accordingly, in order to separate the liquids from each other, the magnitude of the power fed to the cavity is between the cavitation levels of the two liquids. As a result, the liquid having the lower cavitation level is thereby vaporized, the vapor rising to the vicinity of valve 14 through which it ultimately escapes as previously described in connection with the gas. Here again, although not absolutely essential, it is nevertheless desirable to provide an acoustical match in order to operate with maximum efficiency.

Although a particular embodiment of the invention has been illustrated and described above by way of example, it is not intended that the invention be limited thereto. Accordingly, the invention should be considered to include any and all modifications, alterations or equivalent arrangements falling within the scope of the annexed claim.

Having thus described the invention, what is claimed is:

Fluid-separator apparatus comprising: coaxially aligned inlet and outlet pipes; a structure completely enclosing a resonant cavity between its walls mounted between said pipes which respectively connect with said cavity on opposite ends thereof; a mixture of two fluids flowing continuously through said cavity from said inlet pipe to said outlet pipe; means mechanically coupled to said structure for separating one of said fluids from the other in said cavity, said means including a rigid substantially flat plate rigidly mounted on said resonant cavity structure and forming the bottom side thereof, and transducers rigidly mounted on the bottom side of said plate for applying ultrasonic power through the plate to said structure and the fluids therein at a frequency for optimum power transfer to said fluids, whereby one fluid constituent is separated in gaseous form from the other fluid; and an escape valve mounted in and extending through the top wall of said structure, said valve connecting directly with said cavity and including means to permit the gas to escape therefrom and to prevent gas from flowing back into said cavity.

References Cited by the Examiner

UNITED STATES PATENTS

| | | | |
|---|---|---|---|
| 2,864,502 | 12/1958 | May | 210—19 X |
| 3,044,236 | 7/1962 | Bearden et al. | 55—277 X |
| 3,109,721 | 11/1963 | Zenner et al. | 55—15 |
| 3,151,958 | 10/1964 | Bodine | 55—15 |
| 3,200,567 | 8/1965 | May | 55—277 X |

FOREIGN PATENTS

| | | |
|---|---|---|
| 927,144 | 4/1955 | Germany. |

ROBERT F. BURNETT, *Primary Examiner.*

D. K. DENENBERG, *Assistant Examiner.*